H. W. LEONARD, DEC'D.
C. G. LEONARD, ADMINISTRATRIX.
ELECTRIC APPARATUS FOR MOTOR VEHICLES.
APPLICATION FILED JAN. 18, 1910.

1,157,011.    Patented Oct. 19, 1915.
2 SHEETS—SHEET 1.

Witnesses:
Peter A. Roe
Edith E. Galloway

H. Ward Leonard Inventor
By his Attorneys
Edwards, Sager + Wooster

Fig. 3

UNITED STATES PATENT OFFICE.

HARRY WARD LEONARD, OF BRONXVILLE, NEW YORK; CAROLYN G. LEONARD, ADMINISTRATRIX OF SAID HARRY WARD LEONARD, DECEASED, ASSIGNOR TO H. WARD LEONARD, INCORPORATED, A CORPORATION OF NEW YORK.

ELECTRIC APPARATUS FOR MOTOR-VEHICLES.

1,157,011.   Specification of Letters Patent.   Patented Oct. 19, 1915.

Application filed January 18, 1910.   Serial No. 538,762.

*To all whom it may concern:*

Be it known that I, HARRY WARD LEONARD, a citizen of the United States, residing at Bronxville, in the county of Westchester and State of New York, have invented certain new and useful Improvements in Electric Apparatus for Motor-Vehicles, of which the following is a full, clear, and exact specification.

My invention relates to means for generating and controlling electric energy, and although particularly well adapted for use in motor vehicles, my invention is likewise applicable in other instances as will more fully appear from the following description. Patent No. 1,122,774, granted to me December 29, 1914 was issued upon a divisional application of the present application and relates to methods of controlling electric energy, whereas the claims of the present application are directed to apparatus, relating particularly to the charging of a storage battery and to the automatic supply of energy from a variable speed dynamo armature to a work circuit, the latter comprising the storage battery and incandescent lamps connected in parallel.

One object of this invention is to secure efficient and reliable actuation, and at the same time obtain a desired automatic control in response to certain conditions by controlling a dynamically generated electric current which in turn controls the production of said dynamically generated energy. I preferably employ a magnetic winding which controls the energy generated and in my preferred form, the automatic control of the current in said magnetic winding is dependent upon electrical conditions in the circuit in which the electric energy is utilized.

In one embodiment of my invention the magnetic winding is the winding of a magnetic clutch connected across the dynamo armature in parallel with the work circuit. But any other suitable form of magnetic winding may be employed so long as it is in shunt to the dynamo armature and is adapted to have its energizing current automatically controlled by the amperes in the work circuit to control the generation of energy by the dynamo armature in accordance with my invention.

My invention is particularly useful for the purpose of automatically charging a storage battery from a source of mechanical energy in which the speed of the driving element varies over a wide range, such as the charging of a storage battery on a gasolene motor car, or other vehicle. With a system arranged in accordance with my invention, the storage battery on such a car may be utilized for operating incandescent lamps for head lights, etc.; also for operating an electric horn; also for supplying the energy for producing low tension or high tension ignition in the cylinders of the gas engine; also for operating electric heaters or electrically heated tools, such as an electric vulcanizer; also for operating electric motors, such as a self-starter for the gas engine or for operating an air compressor; also for producing electric signals, such as by any suitable wireless system, and in general for using the energy of such a storage battery or the energy from the generating dynamo for any of the many uses to which it is adapted.

My invention accomplishes the objects in a simple, economical and reliable manner and secures various other new and useful results, and has various other advantages which will be understood from the following description by those skilled in the art.

By the use of my invention, the well known tendency of the contacts of a vibratory controller using metallic contacts to stick under the influence of the arcing, is practically overcome without damaging increase in the voltage upon the lamps, because a certain increase of voltage of the dynamo results in a much stronger magnetic pull to open the contacts when they tend to stick, than has been the case in former types of vibratory controllers in which the magnetic pull was proportionate more directly to the increase of voltage, or in which the current in the controlling magnet was due primarily to the increase of current through lamps or other translating devices not having low internal resistance or high counter electromotive force.

Referring to the accompanying drawings.

In the particular embodiment of my invention which is illustrated herein, I employ a magnetic clutch, this being desirable in some instances, because the watts of the exciting coil of the magnetic clutch can readily be made so small that the output of a dynamo of considerable size can readily, reliably and efficiently be controlled by the vibratory controller herein later described. But it will be understood from the disclosures herein that the clutch is not necessarily used, as its function in controlling the voltage of the generator may be attained by other means.

Figures 1, 2:
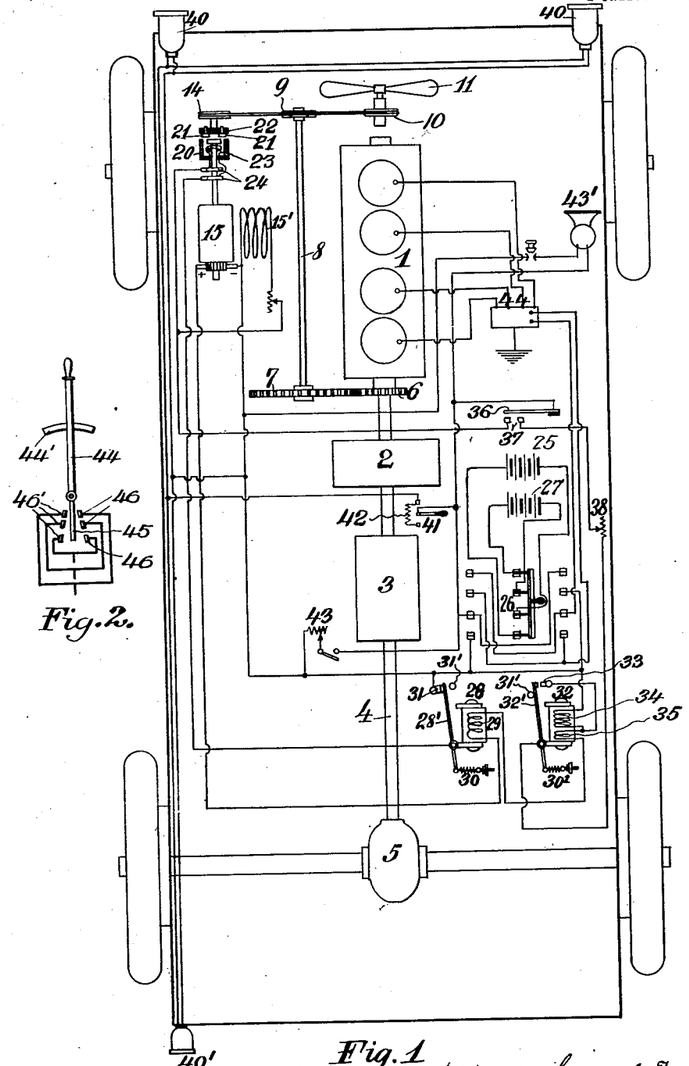
Figure 1 is a diagram illustrating one form of my invention applied to a gasolene motor car and showing the various circuit connections of the apparatus.
Fig. 2 is a detailed view illustrating a modified arrangement of the circuit closing switch, in which the latter is arranged to be controlled by the operation of the change gear lever.
Figure 3:
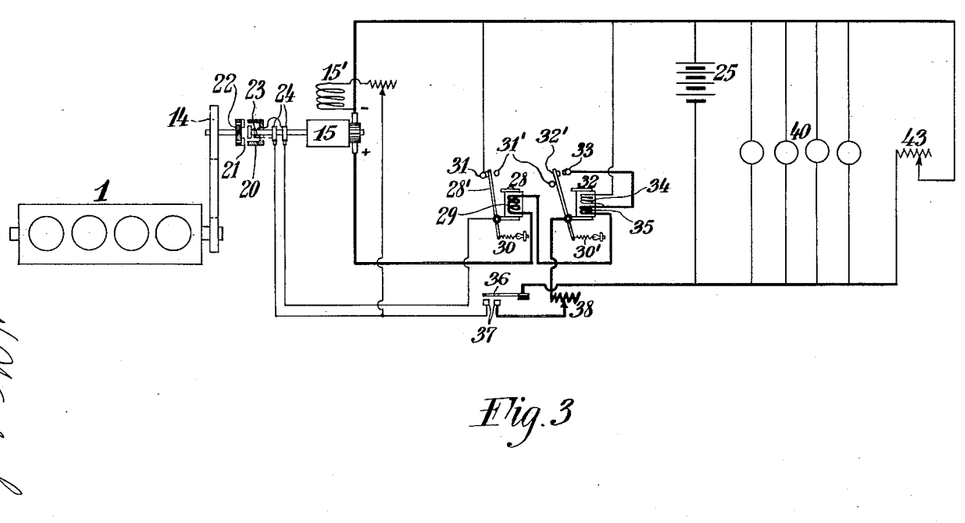
Fig. 3 is a simplified diagram illustrating certain of the apparatus and connections disclosed in Fig. 1, various parts being omitted for clearness; it is to be understood that no attempt has been made in this figure to show such a driving ratio between the engine and the dynamo or such proportions of parts of other apparatus as may be desirable in practical construction, the figure being merely to show in simple form a diagram of connections.

Referring to Fig. 1, an outline of a motor car is indicated in a general way having the gas engine 1, the clutch 2, the change gear box 3, the driving shaft 4, and the rear axle equalizing gear box 5. On the engine shaft is shown a gear 6 which drives a larger gear 7 for driving the usual counter-shaft 8, which in turn operates the engine valves and other devices as is customary, the speed of the counter-shaft being one-half that of the engine shaft in the usual type of gas engines. On the shaft 8, is mounted a driving pulley 9, over which passes a driving belt which serves to drive the pulley 10 and its shaft which carries the cooling fan 11. After passing over the pulley 10, the belt also passes over a third pulley 14 mounted to revolve on a shaft suitably supported in bearings. The driving pulley 9 thus drives the cooling fan as well as the pulley 14, which latter forms the driving means for the magnetic clutch and electric generator 15.

The magnetic clutch is shown of the iron-clad type, one element 20 having a cylindrical outer portion and a central core extending from one end as indicated in Fig. 1. The other element of the magnetic clutch comprises the circular non-magnetic plate 22, fixed upon and rotating with its supporting shaft which also carries the pulley 14. There are a number of perforations in the plate 22 in which are armatures 21 in the form of pieces with enlarged heads, which heads are large enough to bridge the space between cylinder 20 and its central core. The perforations are large enough to allow the armatures to be axially movable freely so that when these armatures are attracted by the other element of the clutch, the magnetic force and the frictional engagement between the faces of the armature and main element of the clutch will be sufficient to drive by means of said armatures the clutch element 20 and the generator 15 which are fixed to the same shaft. When the clutch is not magnetized, the pulley 14 and the plate 22 carrying the iron armatures 21 rotate freely together without driving the clutch element 20 or the generator 15. The exciting coil 23 of the clutch is wound about the central core as indicated in the drawing and the terminals engage two slip rings 24 respectively which are mounted upon and carried by the clutch element 20, or its shaft. The use of a plurality of independently movable armatures, each of comparatively light weight, gives many advantages.

The batteries to be charged are indicated in two different sets, the upper set 25 being connected to the two lower central contacts of a four-pole double-throw switch 26, and the lower battery set 27 being connected to the two upper central contacts of this switch. At 28 is indicated an automatically responsive electro-magnet having a series coil 29 and a pivotally mounted armature or contact lever 28' normally held in the position shown against a fixed contact 31 by means of a spring 30. When the current passing through the coil of magnet 28 becomes excessive, the armature 28' will be attracted and turned upon its pivot against the action of the spring 30, breaking the circuit passing through the fixed contact 31, armature or contact lever 28', and from its supporting part to the conductor connected thereto. This movement of the armature is limited by a pin or other stop 31', and when the current in the coil of the magnet is sufficiently reduced, the circuit will be again closed by the action of the spring overcoming the magnetic force of the magnet. At 32 is indicated another automatically responsive electromagnet having the pivotally mounted armature in the form of a contact lever 32'. This contact lever is held open against the pin or stop 31' by the action of the spring 30' until the magnetic pull upon the armature 32' is sufficient to overcome the force of the spring, and the armature or contact lever then makes contact with the fixed contact 33, closing the circuit through this fixed contact, the armature or contact lever 32' and through the support of the lever to the conductor connected thereto. This electromagnet 32 is provided with a potential or shunt winding 34 and preferably an additional series winding 35, and although the windings are shown displaced, it will be understood that they may be superimposed or otherwise related as desired. It will be observed that the shunt winding 34 is permanently connected across the terminals of the dynamo armature 15, and therefore is responsive to the voltage of this dynamo armature 15. When the dynamo voltage rises to a predeterminable amount, this voltage winding 34 automatically effects the closure of its coöperating switch 32', which switch is in the path of the charging current.

For controlling the main circuit of the dynamo and its shunt field winding 15', as well as the circuit of coil 23 of the electromagnetic clutch, I provide a seat switch which is adapted to be closed when the operator of the vehicle takes his seat in the vehicle. This is in the form of a conducting plate 36 supported upon an insulating block and adapted when depressed to engage the fixed contacts 37.

Suppose the switch 26 to be closed to the left. This connects battery 25 through the two lower blades of 26 to the circuit of the dynamo shunt field and the magnetic clutch coil, while battery 27 is connected through the two upper blades of 26 to the ignition circuit leading to 44 containing the induction coil.

After the operator has taken his seat, thereby closing the seat switch 36, the left-hand contact 37 establishes the circuit of the dynamo shunt field winding and the circuit of the magnetic clutch. The right-hand contact 37 is a switch contact in series with the automatic low voltage switch 32' to insure the opening of the circuit containing the battery and dynamo armature when the operator is not using the motor car, even if the automatic low voltage switch should fail to open this circuit.

Assuming the switch 26 to be closed to the left and the seat switch 36 to be closed, the circuits created thereby are as follows: From the right-hand terminal of battery 25 the circuit passes through next to the lowest middle contact of switch 26, thence through the switch blade to the left-hand contact which is next to the lowest contact; thence to and through switch 36 and from the left-hand contact thereof to the upper collector ring 24, thence through the magnetic coil 23 to the lower collector ring 24, thence to the pivot of the vibratory switch 28', through switch 28' and its contact 31 and by a conductor to the lowest left-hand contact of switch 26, thence through the switch blade to the lowest middle contact 26 and from there back to the left-hand terminal of the battery 25. Another circuit may be traced as above to the left-hand contact 37 of the seat switch and through the conductor leading therefrom to a branch circuit and through the shunt field winding 15' to the right-hand brush of the armature 15, this shunt field circuit continuing from this brush to the left-hand lowest contact of switch 26 and thence through the switch blade as above described to the left-hand terminal of battery 25. It will thus be seen that the battery 25 by these connections is in circuit with the dynamo shunt field and the magnetic clutch coil.

The circuit of the current supplied to the ignition means under the above assumptions may be traced as follows: from the right-hand terminal of battery 27 to the middle contact of switch 26 which is next to the uppermost contact, then through the switch blade to the next to the upper left-hand contact of switch 26, then through the coil of the ignition means 44, returning therefrom to the upper left-hand contact of switch 26, through the switch blade to the upper middle contact and then to the left-hand terminal of battery 27. This causes the ignition circuit to be independently supplied by the battery 27.

The clutch circuit and the shunt field being energized by the closure of the manually operated switch 36, and the gasolene motor being in operation, the voltage of the armature 15 rises until finally the switch 32' is automatically closed by the voltage coil 34. This establishes the charging circuit which may be traced as follows: From one terminal of the generator 15 marked plus (+) the main circuit may be traced through the overload coil 29, series coil 35 to contact 33, and when the contact lever 32' is attracted by the magnet 32, the operator having previously closed the seat switch 36, the circuit will pass through this lever to the conductor connected to its support, through an adjustable resistance 38 to one of the contacts 37, and thence through the plate 36, when this switch is closed by the operator, to a conductor leading to the next to the lower fixed contact at the left of the double-throw switch 26. When this switch is thrown to the left the circuit will continue through one of the blades of the switch to one of the middle contacts, thence through the battery set 25 to the lowest middle contact, and thence through a switch blade to the lowest fixed contact at the left, and then by a conductor back to the negative terminal of the generator armature 15. It will thus be seen that when this main circuit is closed as described, one of the battery sets is connected in series with the armature 15 of the charging dynamo. It will also be seen that when the double-throw switch 26 is closed to the left, as above referred to, and the plate 36 is brought against the fixed contacts 37 by the operator, the circuit of the field winding 15' of the generator will be closed from say the negative terminal of the battery set 25, which latter is connected by switch 26 to the negative terminal of the armature 15, through the field coil 15′ and an adjustable field resistance to one of the contacts 37, then to the plate 36 and thence to the positive terminal of the battery set 25, through the switch 26.

It will be also seen that when the switch 26 is closed to the left and the plate 36 is in contact with the contacts 37, that a circuit extends from the negative terminal of battery set 25 through the switch 26 to fixed contact 31, thence through the contact lever 28′ to the conductor connected to its support, thence through one of the collector rings 24 to the magnetic clutch coil 23, then to the other collector ring 24 to one of the contacts 37, thence through plate 36 and through switch 26 to the positive terminal of battery set 25. Thus, under normal operating conditions, the circuit of the magnetic clutch coil is closed unless interrupted by the automatic action of the electromagnet 28 by the attraction of its armature.

As above pointed out, the circuit between the armature 15 and the battery set 25 is not closed even when the switch 26 is thrown to the left, and even if the plate 36 makes contact with the fixed contacts 37, unless the contact lever 32′ is automatically closed against the fixed contact 33. The final closing of this circuit is controlled by the potential winding 34 of the electromagnet 32, the path of this winding being from the positive terminal of armature 15 through the series windings 29 and 35, thence through the potential winding 34 and thence by a conductor to the negative terminal of the armature 15. It will thus be seen that this winding 34 is directly subjected to the electromotive force generated by the armature 15, and the contact lever 32′ will not be closed until the electromotive force of the armature 15 is sufficiently high to cause the coil 34 to attract its armature. This magnet thus insures that the armature circuit will be closed upon the battery 25 only when the electromotive force of the armature, due to its speed and field strength, is of a sufficient amount to charge the battery set, and when from any cause this electromotive force is not sufficiently high, this main circuit will be interrupted by the action of the spring 30′ overcoming the magnetic pull of the electromagnet 32. The series coil 35 serves to insure a firm contact when the switch is closed by the increased pressure due to the increased magnetic effect after the switch is closed, and also acts to insure the opening of this voltage switch in case the charging current should happen to reverse, as this would make the action of the series coil differential to that of the shunt or potential coil 34.

Continuing the description of the apparatus indicated in Fig. 1, it will be noted that when the switch 26 is closed to the left, current will be supplied through this switch from the battery set 25, as well as from the generator armature 15 when its main circuit is closed, to the circuit supplying the electric head lights 40 and tail light 40′. In the circuit of these translating devices I introduce a double pole single throw switch 41 adapted to engage either one of two fixed contacts between which latter a resistance 42 is connected. The path of this circuit may be traced from the positive terminal of battery set 25 through switch 26 to switch 41, and when the latter is closed to engage the upper contact, the circuit continues directly to one main supplying the lamps, then through the lamps shown connected in parallel with each other to the return wire and thence to the negative terminal of the battery through switch 26. When the switch 41 is thrown so as to engage the lower fixed contact connected to resistance 42, the path of the lamp circuit will be the same as before except the resistance 42 will be connected in series therewith causing the lights to be comparatively dim which will be more desirable in going through cities or towns, as distinguished from the brighter light desired in traveling over poorly lighted roads, and in the latter case the resistance 42 is cut out by closing the switch 41 through the upper fixed contact. In addition to supplying the lights, the battery may also supply various other translating devices such as the electric heater 43, the electric horn 43′, &c., as desired.

It will be noted that when switch 26 is closed to the left, battery 27 will be connected to the two upper left hand fixed contacts from which extends a circuit for supplying the energy for the electric ignition in the gas engine. This ignition may be of any desired type and controlled by any of the usual devices, and I have therefore indicated this ignition circuit as leading to a box 44, containing the customary one or more induction coils, contact breakers, etc. I preferably supply the ignition circuit from a battery set 27 independent of the battery 25, and independent of the circuit of various other translating devices and of the charging dynamo 15 so that energy supplied to the ignition circuit will be uniform and less likely to fail by reason of any derangement of the translating devices or of the automatic controlling means upon the charging circuits. Moreover, with the translating devices connected in the circuit containing the dynamo 15 and the battery 25, much of the energy consumed by these translating devices will pass directly to them from the generator without necessarily taking energy from the battery. By means of switch 26, however, the battery set 25 may be caused to supply the ignition circuit and the battery set 27 will then be connected to supply the lamps and other translating devices and to the circuit of the charging generator 15. Thus, when the switch 26 is thrown to the right, it will be seen by tracing the circuits that battery 25 will supply the ignition circuit and battery 27 will be connected to supply other translating devices and being connected in circuit with the charging dynamo 15 will be subjected to the automatic control of this circuit by the electromagnetic switches 28, 32. Thus, by this switch 26, the batteries can be interchanged on the circuits as desired and may be connected to be charged by the charging dynamo when desired. This arrangement results in greater reliability of service, ease and simplicity of testing in case of any trouble and a ready means of comparing the condition of the two batteries.

The box containing the batteries will be located in any convenient location on the vehicle and the automatic electromagnetic switches, switch 26 and other controlling switches will preferably be mounted together upon an easily accessible panel and properly inclosed for protection.

In operation, the switch 26 will be closed to the left or to the right and one set of batteries will then supply the ignition circuit and the other the various translating devices. When the operator causes plate switch 36 to engage the fixed contacts 37, and assuming that the engine is operating, the circuit of the magnetic clutch coil 23 will be closed through one of the battery sets by means of switch 26, and the closure of this circuit will cause the armatures 21 to be attracted by the other element of the clutch and so cause the rotation of the generator 15. Whenever the electromotive force generated by the armature 15 attains a suitable value adapted for connection to the battery circuit, the potential winding 34 of the electromagnetic switch 32 will cause the magnet to attract its movable armature and close the circuit through the battery and armature 15 as above explained. I have indicated the tension of spring 30' as being adjustable so that the armature 32' will be attracted when the electromotive force of the armature 15 attains a proper amount. When the electromagnet 32 is deënergized from any cause, or the electromotive force of the circuit becomes undesirably low, or in case a reversed current through the series coil 35 should occur so as to decrease the magnetization to such an amount that the spring 30' overcomes the magnetic attraction, the charging circuit will be interrupted and not closed again until the electromotive force of the generating armature is sufficient to cause the contact lever 32' to be again attracted. The electromagnetic switch 28 serves to automatically control the energy delivered by the generating armature so that it will not exceed a predetermined amount and protect the batteries from an excessive charging current and also to limit the speed of the dynamo to a proper amount irrespective of the speed of the driving engine. Thus, if, during operation, the electromotive force of the generator should become so high as to cause the current to be more than a predetermined amount, the coil 29 will cause the contact lever 28' to be attracted and so break the circuit of the clutch coil 23. This will at once cause the speed and the voltage of the generator to decrease and so cause the current in the circuit containing the winding 29 to be decreased until the strength of the magnet 28 is reduced to such an amount that the contact lever 28' is released. This release causes the switch 28' controlling the current in the shunt winding 23 to be automatically closed again, which in turn causes a sudden, pronounced and rapid increase of current through the winding 29 and the battery, which causes the magnet 28 to powerfully and rapidly pull open the contact element 28'. This automatic opening and closing of the contact element 28' to control the shunt winding 23 occurs as often as required by the changing conditions of practical operation.

After the voltage of the dynamo has risen enough to effect the automatic closure of the low voltage switch 32', the speed of the motor can be increased to a predeterminable amount before the automatic switch 28' responsive to the change in the electrical conditions of the armature circuit will respond to reduce the voltage of the dynamo. The increase of speed needed to effect the automatic opening of this automatic switch 28' can be controlled and adjusted as desired. One form of control is indicated by the variable resistance 38. By inserting more resistance in 38 the range in speed of the dynamo before the automatic switch 28' is opened, can be increased and modified as desired. My preferred way is by suitably adjusting the variable resistance 38. The switch 28' after opening will cause the voltage of the dynamo to be reduced until finally the magnetic pull due to the coil 29 will become less than that of the spring 30, and thus the switch 28' will be automatically closed again by the spring 30; the voltage of the dynamo will then again rise and again fall and this will continue indefinitely. The voltage impressed upon the charging circuit therefore fluctuates between maximum and minimum values, but on account of the steadying action of the storage battery these wide and rapid fluctuations of energy in the charging circuit are equalized by the battery so as to keep the voltage on the lighting circuit satisfactorily constant.

The magnetic winding 23 being a shunt winding across the dynamo armature 15 and the dynamo armature voltage being preferably low in amount, and the movement of the contact element 28' being quite positive due to the wide rapid fluctuations through the winding 29, there is no detrimental spark at contacts 31, 31', which are preferably of some arc resisting material such as platinum.

At a certain speed of the motor the automatic switch 28' will rhythmically and automatically open and close and thereby cause unidirectional fluctuating amounts of charging energy to be delivered to the battery. As the speed of the motor varies from such a certain speed the length of time the switch remains closed, compared with the length of time it remains open, varies. When the speed of the motor is such that this switch is just beginning to act automatically, the period of closure is large compared with the period of opening. As the motor speed increases the period of closure becomes less and the period when it is open becomes greater, when compared with the total period of time. By varying the magnetizing time element of the field winding of the dynamo by well known methods and means, I can control these unidirectional energy fluctuations within limits.

In instances where the speed of the motor or the design of the dynamo makes it possible to keep the dynamo driven by the motor even at comparatively high speeds, I can control the energy in the armature circuit as indicated so that the magnetic clutch will only act under abnormally excessive conditions or in case some part becomes bound in which case the magnetic clutch would protect the devices and reduce the likelihood of a stoppage on the road.

By charging a battery in accordance with my invention, the battery is maintained in a very efficient condition. The rapid variation of the charging energy and the frequent slight discharge consequent upon the operation of the electric horn, electric lights, and other devices, tends to efficiently form the active matter of the battery, and prevent the formation of detrimental chemical compounds.

It will be observed that the winding 29 carries the entire current which goes to the battery and the lamps which are connected in parallel with each other. When this entire current reaches a predetermined maximum, the switch 28' is automatically magnetically moved to its open position against the action of the spring 30. The current in winding 29 then rapidly falls, and as soon as it has fallen enough so that the spring 30 overcomes the magnetic effect of winding 29, the switch 28' is automatically closed by the spring 30. This cycle is repeated as long as such conditions exist. Thus the charging current is controlled by the winding 29 so as to produce a rapidly recurring series of unidirectional fluctuations of current, the integration of which is a substantially constant current independently of change of speed of the source of power in practice. It will be noted that the average current of the dynamo will be nearly constant and its average voltage will be nearly constant; hence, the output of the dynamo will be substantially constant.

By the arrangement in accordance with my invention many new and useful results are secured, as compared with former systems in which the charging current is responsive to the circuit voltage, or the dynamo speed, or the current through the battery solely; also, as compared with systems in which the charging current is comparatively steady from moment to moment.

The wide change of current values through winding 29 from moment to moment insures a positive vibration of the switch 28' in response to these fluctuations of current, and eliminates the necessity of dash-pots while reducing to a minimum the detrimental effects due to friction and mass of the switch 28' and associated parts.

It will be noted that my system employing a widely fluctuating current integrating to a substantially constant unidirectional current, embodies as an essential element the storage battery whose substantially fixed counter voltage and low ohmic resistance enable it to absorb these energy fluctuations and store them while preventing rapid fluctuations of candle power at the lamps and also obviating the great changes in voltage which would occur upon the circuit if the storage battery were not connected across the armature and in parallel with the lamps.

In Fig. 1, I have described the switch 36 adapted to engage contacts 37 as being closed by the operator when he takes his position in the car. Instead of this switch being controlled in this way, the same circuits may be arranged to be closed by the operator when he moves the gear lever into running position. In Fig. 2, the gear lever 44 is shown working in the slotted plate 44' of the usual type, such as the plate in the form of an H for selective control of the change gears. On an extension of this hand lever is arranged a conducting strip 45, which when the lever is thrown forward or backward from the central position, will cause the conducting strip 45 to engage with a set of three contacts 46 at the right, or with three similar contacts 46' shown at the left. The fixed contacts opposite each other are shown electrically connected together so that the same electrical connection will be made whether the gear lever be moved forward or backward. From each of the three pair of contacts a conductor extends and which will be connected to the other apparatus the same as the conductors extending from the switch plate 36 and fixed contacts 37 of Fig. 1 that is, the upper pair of contacts of Fig. 2 correspond say to plate 36, the middle pair correspond say to the right hand fixed contact 37, and the lower pair correspond to the left hand fixed contact 37 of Fig. 1. Thus, the same electrical connections are attained by the arrangement of Fig. 2 except that the connection of these contacts is dependent upon the throwing of the gear lever into an operating position instead of being dependent upon the operator taking his position in the machine. Of course various other arrangements of circuit and controlling devices could be utilized and be within the scope of my invention.

Although I have described certain embodiments of my invention, it will be understood that the apparatus and arrangements may differ in various other embodiments of my invention without departing from the scope thereof, as defined in the appended claims.

Having thus described my invention, I declare that what I claim as new and desire to secure by Letters Patent, is—

1. The combination of a source of mechanical power capable of being varied from zero to a maximum speed, a dynamo armature adapted to be driven by said source, a storage battery, connecting means therefor, an electromagnetic winding in said connecting means, a vibratory switch element adapted to be vibrated between its open and closed positions in response to maximum and minimum current passing through said winding, and an electromagnetic winding for controlling the voltage generated by said armature, the current passing through said last named winding being controlled by said switch element.

2. In an automatic charging apparatus, a storage battery, a dynamo armature, means for connecting said storage battery with said dynamo armature, a magnetic coil for controlling the voltage produced by said armature, a vibratory switch element adapted to control the current in said magnetic coil, and means for vibrating said switch element comprising an electromagnetic winding responsive to current delivered by said dynamo whereby the charging current automatically controls itself.

3. In combination, a storage battery, a dynamo armature, a magnetic coil for controlling the voltage produced by said armature, a vibratory switch element for controlling the current in said coil, and an electroresponsive winding responsive to a predetermined condition of the energy in the charging circuit and controlling the vibration of said switch element.

4. In a battery charging and incandescent lighting system, the combination of a battery, a dynamo for charging the battery, a plurality of incandescent lamps connected with the battery, and automatic controlling means for fluctuating the voltage of the dynamo between limits and thereby maintaining a substantially constant average current delivered by the dynamo armature, irrespective of the number of incandescent lamps in use, said means comprising a vibratory switch and a winding carrying the current delivered from the dynamo armature to said battery and lamps.

5. In an automatic battery charging system, a source of power whose speed must be varied over a wide range to meet conditions in practice, a battery charging dynamo armature driven thereby, a storage battery, and an automatic vibratory controller, said controller comprising a stationary switch contact element, a coöperating movable switch contact element, a magnetic armature whose movement controls the movement of said movable contact element, a spring tending to hold said movable contact element in its closed position, a coöperating magnetic winding connected in a circuit containing the dynamo armature, said magnetic winding and the battery in series, and a shunt winding for controlling the voltage generated by the dynamo armature, the current in said shunt winding being controlled by said contact elements, whereby when the speed of the source of power increases sufficiently, the current through said magnetic winding controls itself by causing the battery charging energy to be automatically controlled to give rapid fluctuations thereof and produce a suitable average charging current.

6. In combination, a dynamo armature, a storage battery adapted to be charged thereby, means for driving said armature, said driving means being arranged to be varied widely in rate of speed, an electromagnetic winding functionally related to said armature and controlling the output of the same, a circuit controlling vibratory switch element adapted when vibrated to fluctuate the current in said winding and thereby control the output of said armature, an electromagnetic winding responsive to the charging energy and constructed to automatically control said vibratory switch element when the energy of the charging circuit exceeds a certain condition, whereby the charging energy delivered by the armature to the battery is automatically controlled under conditions of widely variable speed of the driving means.

7. In a battery charging apparatus for motor vehicles, a dynamo armature, a series magnetic winding, a storage battery, said dynamo armature, series winding and storage battery being connected in a circuit in series with each other and the voltages of the armature and battery being opposed in said circuit, a shunt winding connected across the dynamo armature and controlling the voltage generated by said armature, a vibratory contact device, the opening and closing of which widely varies the current in said shunt winding and thereby rapidly and widely fluctuates the voltage generated by said armature and thereby rapidly and widely fluctuates the current in said series circuit, so as to integrate the current to a suitable charging current, said series magnetic winding controlling the movement of said contact device, and a spring acting counter to said series magnetic winding, whereby when the voltage generated by the armature increases and increases the current through said series magnetic winding and battery, said contact device is pulled open by a powerful magnetic pull in effecting the vibratory movements of said contact device.

8. In a dynamo lighting system for a gasolene motor car, a dynamo adapted to be driven by power derived from the gasolene engine, a storage battery of substantially fixed counter electromotive force and low ohmic resistance connected in a circuit including said battery and the armature of said dynamo, a magnetic coil in series with said dynamo armature and said battery, a vibratory switch element adapted to be rapidly vibrated between two definite positions, a spring tending to move said switch element to its closed position and the magnetic pull of said magnet being adapted to move said element to its open position, and means dependent upon the to and fro movement of said element for fluctuating the current output of said armature whereby when the speed of said engine exceeds a certain amount said element is automatically and rapidly vibrated to cause a rapidly fluctuating charging current.

9. In a lighting system for a motor car having a gasolene engine as the source of motive power, a dynamo adapted to be driven by said engine, a storage battery of substantially fixed counterelectromotive force and low internal resistance connected in a circuit including the armature of said dynamo, and electroresponsive means responsive to the charging current supplied by said armature for causing the production by said armature of a rapidly fluctuating charging current which integrates to a substantially constant average current, said means comprising a vibratory switch element rapidly and positively moved in one direction in response to maximum current to reduce the current, and rapidly and positively moved in the other direction to increase the current.

10. The combination of a storage battery having translating devices in parallel therewith, a dynamo armature, means for connecting said armature and said battery in a closed circuit, a winding for controlling the voltage generated by the armature and connected across said circuit, a vibratory switch in circuit with said winding and for controlling the current in said winding, and a winding responsive to the entire current supplied by said armature to said battery and translating devices for automatically vibrating said switch.

11. In combination, a source of mechanical power, a dynamo, a driving connection between the armature of said dynamo and said source, a storage battery, and self protective electrical means electrically connecting said battery with said armature for charging the same, said electrical means comprising a vibratory circuit controlling element for automatically controlling the speed of said armature within a certain limit corresponding to a certain predetermined maximum charging current.

12. In combination with a storage battery, automatic battery charging means comprising a dynamo armature, an electromagnetic winding responsive to an increase in the output of said armature, a vibratory circuit controlling element automatically and suddenly moved when said output causes a certain maximum condition in the charging circuit, means controlled by said element for effecting a decrease in the output, and means for automatically and suddenly moving said element to another position when the output has been reduced whereby said element is automatically vibrated so that the battery is automatically charged by energy fluctuating between certain maximum and minimum limits.

13. The combination of a storage battery, a dynamo armature, translating devices, and electrical connections coöperating therewith, said electrical connections comprising a magnetic coil connected in shunt with said armature, a vibratory switch element for controlling the magnetic effect of said coil, and a magnetic coil for controlling the vibration of said switch element, said last named magnetic coil being energized by the current supplied to said battery and to said translating devices by said dynamo armature.

14. In combination with a battery, automatic battery charging means comprising a source of mechanical power, the speed of which is adapted to vary from a certain speed to more than twice such speed, a dynamo electric winding producing electric energy derived from said source of mechanical power, means for connecting said winding to the battery for charging said battery, and means for causing said dynamo electric winding to produce a series of unidirectional fluctuations of energy for charging said battery, said latter means comprising an automatically vibrated circuit controlling element the vibration of which is dependent upon the electrical condition of the charging circuit.

15. The combination with a self-propelled vehicle, of an automatic electric lighting system comprising a dynamo armature driven by the motor of the vehicle, a storage battery, a plurality of incandescent lamps adapted to be connected in parallel with said battery, and controlling means for controlling the output of said dynamo, said controlling means comprising a magnetic coil carrying the entire current supplied to said battery and said lamps, a spring actuated vibratory switch automatically closed by its spring and automatically opened by the magnetic effect of said magnetic coil, and a second magnetic coil controlled by said switch and controlling the output of said armature.

16. In an automatic lighting system for a self propelled vehicle, the combination with the engine of the vehicle, of an automatically controlled dynamo, a storage battery connected across the armature of said dynamo, lamps adapted to be connected in parallel with said battery, and automatic controlling means for said dynamo, said controlling means comprising a vibratory switch responsive to fluctuations of the energy output of the dynamo and causing by its vibration such fluctuations to maintain a proper average charging current.

In testimony whereof I affix my signature, in presence of two witnesses.

H. WARD LEONARD.

Witnesses:
   JOHN G. QUINBY,
   MARY E. QUINBY.